March 31, 1931. R. C. HUMPHREY Re. 18,019

AUTOMOBILE BRAKE ADJUSTER

Original Filed Dec. 10, 1926

INVENTOR
RAYMOND C. HUMPHREY
BY H. O. Clayton
ATTORNEY

Reissued Mar. 31, 1931

Re. 18,019

UNITED STATES PATENT OFFICE

RAYMOND C. HUMPHREY, OF SPRINGFIELD, MASSACHUSETTS, ASSIGNOR TO BENDIX BRAKE COMPANY, OF SOUTH BEND, INDIANA, A CORPORATION OF ILLINOIS

AUTOMOBILE BRAKE ADJUSTER

Original No. 1,635,417, dated July 12, 1927, Serial No. 154,015, filed December 10, 1926. Application for reissue filed May 4, 1929. Serial No. 360,572.

My invention relates to a new and useful improvement in an automobile brake adjuster, which may be readily applied to the operating lever of a brake, to hold the operating lever in proper position so that the brake bands may be properly adjusted.

Another object of the device is to provide an adjustable handle that may be lengthened to provide means to increase the leverage, thereby allowing a greater force to be applied to the operating lever of a brake.

A still further object of the device is to provide an adjustable base member applicable to different makes of automobiles.

With the foregoing and other objects in view, the invention resides in certain novel and useful structure and arrangement as will be hereinafter more fully described, set forth in the appended claims, and illustrated in the accompanying drawing, in which:—

Figure 1:
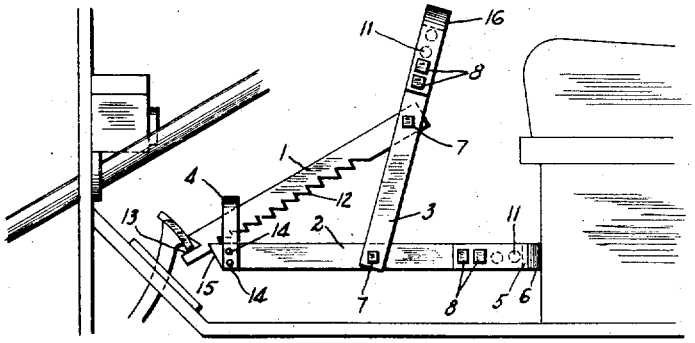
Figure 1 shows the device as applied to the brake pedal of an automobile.
Figure 2:
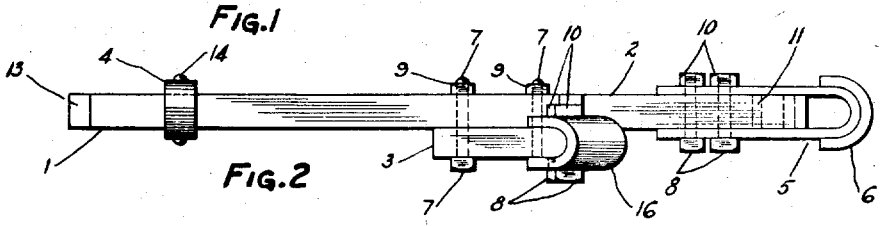
Figure 2 is a plan view of the device.
Figure 3:
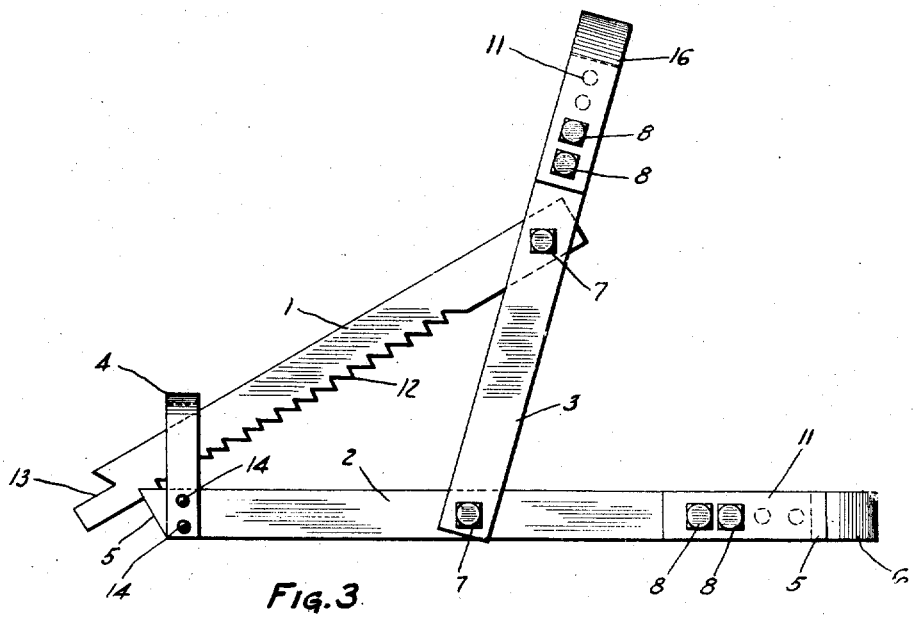
Figure 3 is a side elevation view of the device.

Referring more particularly to the drawings, wherein like numerals indicate like parts, 2 designates a base member angularly shaped at one end as shown by the numeral 15. A U-shaped base extension member 5 may be secured to the base member 2 by means of the bolts 8 and the nuts 10. The base extension member provides the means whereby the base member may be extended to fit the different make of automobiles, by moving the base extension member outward and inserting the bolts 8 through the base extension member 5 and the holes 11 in the base member 2. The forward end of the base member 2 is provided with a guide yoke 4 which is rigidly secured to the base member by means of the rivets 14. A cushion 6 of leather or a similar material is fastened to the base extension member 5 on the base member, and prevents the device from slipping or marring the automobile when it is in operation.

A hand lever 3, for manually operating the device, is pivoted to the base member 2 by means of the bolt 7 and the nut 9. The hand lever may be provided with a handle extension member 16 to provide means to lengthen the handle so that a greater leverage may be had from said handle, thereby allowing a greater force to be applied to the operating lever of a brake, and also to extend the handle above the seat of an automobile so that it may be operated without interference. It will be seen by referring to the drawing that my device is so constructed that I can use an exact design of a handle extension member on the handle 3 as I use on the base member, and the means of adjustment is the same as on the base member, that is, by inserting the bolts 8′ through the handle extension member 16 and the holes 11 in the handle 3.

A depressing member 1 is pivoted to the handle 3 by means of the bolt 7′ and the nut 9. The forward and upper side of the depressing member is provided with a notch 13 so that it may readily engage with the foot pedal of an automobile brake. The under side of the depressing member is provided with a plurality of notches 12 that engage with the angularly disposed end of the base member. The depressing member is in the same perpendicular plane with and above the base member, and held in that position by means of the guide 4. The depressing member works slidably through the guide 4, and the guide is so constructed that there is sufficient clearance between the guide and the depressing member to take care of the irregular angularity of the depressing member when in different operative positions when the notches on the depressing member engage with the angularly shaped end of the base member.

I claim:

1. In an automobile brake adjusting device, the combination of a base member, a base extension member attached to the said base, a guide attached to the base member, a handle pivoted to the base member, a handle extension member attached to the handle, a depressing member co-operating with the guide, said depression member pivoted to said handle and in the same perpendicular plane with and above the base member and co-operating therewith.

2. In an automobile brake adjusting device, the combination of a base member angularly shaped at one end, a base extension member attached to said base member and in alignment thereto, a guide attached to the base member, a handle pivoted to the base member, a handle extension member attached to the handle and in alignment thereto, a depressing member pivoted to said handle confined by the guide and in the same perpendicular plane with and above the base member and co-operating with the angular shaped end thereof.

3. In an automobile brake adjusting device, the combination of a base member angularly shaped at one end, a base extension member attached to the said base member, and means for locking the base extension member at any predetermined adjustment, a guide attached to the base member, a handle pivoted to the base member, a handle extension member attached to the handle, and means for locking the handle extension member at any predetermined adjustment, a depressing member pivoted to the handle, said depressing member provided with a plurality of notches on the under side co-operating with the angular shaped end of the base, and also provided with a recess on the free end to engage with a foot pedal of an automobile brake, said depressing member in the same perpendicular plane with and above the base member.

4. In an automobile brake adjusting device, the combination of a base member angularly shaped at one end, a base extension member attached to said base member, and adapted to be extended or removed, a guide attached to the base member, a handle pivoted to the base member, a handle extension member attached to the said handle and adapted to be extended or removed, a depressing member pivoted to the said handle, and the said depressing member provided with a plurality of notches on the under side, and also provided with a recess on the free end, said depressing member in the same perpendicular plane with and above the base member and free to work slidably through the guide to cause the notches on the depressing member to engage with the angularly shaped end of the base member.

5. In an automobile brake adjusting device, the combination of a base member, a handle pivoted to the base member, and a depressing member pivoted to said handle and lying in the same perpendicular plane with and above the base member adaptable for co-operation therewith.

6. In an automobile brake adjusting device, the combination of a base member angularly shaped at one end, a handle pivoted to the base member, and a depressing member pivoted to the said handle having a portion engaging the angular shaped end.

7. In an automobile brake adjusting device, the combination of a base member, an operating member pivotally supported thereon, and a depressing member secured to said operating member having a pawl-and-ratchet connection with said base member.

8. A motor vehicle brake applying device comprising a base, a dog on one end of the base, an adjustable member on the other end of the base, a thrust member, a ratchet on the thrust member co-operating with the dog and an adjustable operating lever fulcrumed on the base and connected to the thrust member for the actuation thereof.

9. A motor vehicle brake applying device comprising a base, a dog on one end of the base, an extension member on the other end of the base, a cushion on the extension member, a guide on the base adjacent the dog, a thrust member retained in position by the guide, a ratchet on the thrust member co-operating with the dog, an operating lever fulcrumed on the base, an extension member on the operating lever and means connecting the operating lever to the thrust member for actuation thereof.

In testimony whereof, I have hereunto signed my name.

RAYMOND C. HUMPHREY.